United States Patent

[11] 3,597,731

[72] Inventors Heribert J. Reitboeck
Turtle Creek;
Thomas P. Brody, Pittsburgh, both of, Pa.
[21] Appl. No. 845,133
[22] Filed July 28, 1969
[45] Patented Aug. 3, 1971
[73] Assignee Westinghouse Electric Corporation
Pittsburgh, Pa.

[54] PATTERN RECOGNITION APPARATUS
10 Claims, 13 Drawing Figs.

[52] U.S. Cl. .......... 340/146.3R
[51] Int. Cl. .......... G06k 9/04
[50] Field of Search .......... 340/146.3

[56] References Cited
UNITED STATES PATENTS
3,177,469 4/1965 Chow .......... 340/146.3
3,432,809 3/1969 Reumerman et al. .......... 340/146.3

*Primary Examiner*—Daryl W. Cook
*Assistant Examiner*—William W. Cochran
*Attorneys*—F. H. Henson and R. G. Bodahl

ABSTRACT: Described is apparatus, employing a mathematical transform involving addition and differencing only, for recognizing patterns or characters which can be distorted or misaligned with respect to optical-sensing means without any sacrifice in the accuracy of the device. When executed on a digital computer, the mathematical transform utilized in accordance with the invention needs only a fraction of the computation time needed for transforms utilized by prior art devices. At the same time, it is better able to cope with certain distortions that are characteristic of hand-printed letters and digits such as inclination, small rotation and the like.

WITNESSES

Theodore H. Wrobel

James F. Young

INVENTORS
Heribert J. Reitboeck
and Thomas P. Brody
BY F. H. Henson
ATTORNEY

PATTERN RECOGNITION APPARATUS

BACKGROUND OF THE INVENTION

While the present invention can be used for the automatic recognition of any pattern, it is particularly adapted for use in the recognition of letters, numerals and other forms of intelligence. One basic requirement in the machine recognition of any pattern is the ability to perform a certain operation on the input function (i.e., the pattern to be recognized) such that a characteristic output function is generated which is independent of the position of the pattern in its normally two-dimensional pattern space. Usually, patterns are initially precepted by means of an electron-optics device such as a plurality of photocells, a vidicon or the like to produce an output signal or signals which can be processed through electrical circuitry to determine the identity of the pattern being viewed by the optical-sensing means. If the pattern is exactly aligned in a predetermined manner with respect to the optical-sensing means, the electrical signal at the output of the optical-sensing means will always be the same for a given pattern and can be fed directly to a comparator which compares this signal with stored information to determine the identity of the pattern being viewed. However, it often happens that a given pattern does not assume the same position with respect to the optical-viewing apparatus, or it may be rotated or distorted.

In order that a characteristic output function identifying a particular pattern is generated which is independent of the position of the pattern in its normally two-dimensional pattern space, the operation, $T$, should transform functions $f(x,y)$ into functions $T\{f\}=g(u,v)$, defined over a certain range, with the following properties:

If $T\{f\}=g(u,v)$, and if $f(x+h,y+k)=f_1(x,y)$, and $T\{f_1\}=g_1(u,v$ then $g_1(u,v)=g(u,v)\cdot m(h,k)$ where either $m(h,k)\equiv 1$ or $m(h,k)$ is a function of modulus 1 so that $$|T\{f_1(x,y)\}|=|g(u,v)|=|T\{f(x,y)\}|$$

A transform of particular interest having these properties is the Fourier transform. It has been widely used in pattern recognition since economic methods for its execution became available such as digital methods using a fast algorithm for the machine calculation of the discrete Fourier transform, namely the fast Fourier transform. One difficulty with the fast Fourier transform, however, is that it involves relatively complicated mathematical computations, meaning that computer apparatus capable of performing the mathematical transform must be relatively complicated also.

In addition to shift invariance, the mathematical transform with invariance regardless of the position or inclination of the pattern being recognized should have other properties. The transformed function $g(u,v)$ should be immune to ($a$) a limited amount of noise and distortion of the input pattern, ($b$) a limited angle of rotation of the input pattern with respect to some reference axis, and ($c$) sharing of the input patterns required for the recognition of hand-printed characters. The mathematical transform should also be able to classify patterns independent of their size.

SUMMARY OF THE INVENTION

As an overall object, the present invention provides apparatus for performing a mathematical transform in the machine recognition of patterns which is independent of the position of the pattern and immune to both a limited amount of noise and distortion of the input pattern and a limited angle of rotation of the input pattern, and at the same time is immune to sharing of the input patterns required for recognition of hand-printed characters.

Another object of the invention is to provide apparatus for performing a mathematical transform in the machine recognition of patterns which is able to classify patterns independent of their size.

Still another object of the invention is to provide apparatus for performing a mathematical transform in the machine recognition of patterns by the use of optical-sensing means and a plurality of groups of memory cells which receive the sums and differences of electrical signals from the sensing means, together with means for adding and differencing electrical signals from the memory cell in each group of memory cells and for storing the sums and differences in a succeeding group of memory cells of the plurality of groups of cells, the addition and subtraction being the only mathematical operations performed on said electrical signals. This materially decreases the complexity of the computation apparatus over what would be required, for example, with a fast Fourier transform.

In accordance with the invention, recognition apparatus is provided comprising optical-sensing apparatus, preferably an array of optical sensors including at least one row extending along a straight line and having N-sensors therein. Each of these sensors is adapted to produce an electrical signal proportional in magnitude to a characteristic of light to which it is subjected. This characteristic of the light may be its intensity; or, in the case where it is desired to recognize colors, the characteristic of the light may be a wavelength characteristic of a particular color. The apparatus further includes a plurality of groups of memory cells each having N-memory cells therein, together with electrical adding and subtracting means connecting the sensors to a first of said groups and electrical adding and subtracting means connecting the memory cells in each of the groups to the memory cells in a succeeding group except the last group in the succession of groups.

The invention is characterized in that the addition and subtraction performed by the adding and subtracting means are the only arithmetical operations performed on the electrical signals. Finally, programmed computer apparatus if connected to the last group of memory cells for recognizing a pattern viewed by the sensors as determined by electrical signals stored in the last group of memory cells.

Instead of a plurality of optical sensors, it will be appreciated that an electron-optics device such as a vidicon can be used in its place with equal effectiveness, but in this case some type of gating means must be employed to separate the video signal into parts indicative of discrete parts of the pattern being viewed. Furthermore, while optical sensors have been shown herein, any other sensor or transducer capable of converting a change in sound, pressure or the like into an electrical signal can be used. As used in the claims which follow, therefore, the term "sensor" means any of the foregoing.

The above and other objects and features of the invention will become apparent from the following detailed description taken in connection with the accompanying drawings which form a part of this specification, and in which.

FIGS. 6A—6H are illustrations of properties of the mathematical transform performed by the circuitry of the invention under shifts of the input pattern, period outputs for small input patterns, and transforms of patterns having a size ratio of 1:2.

Figure 1:
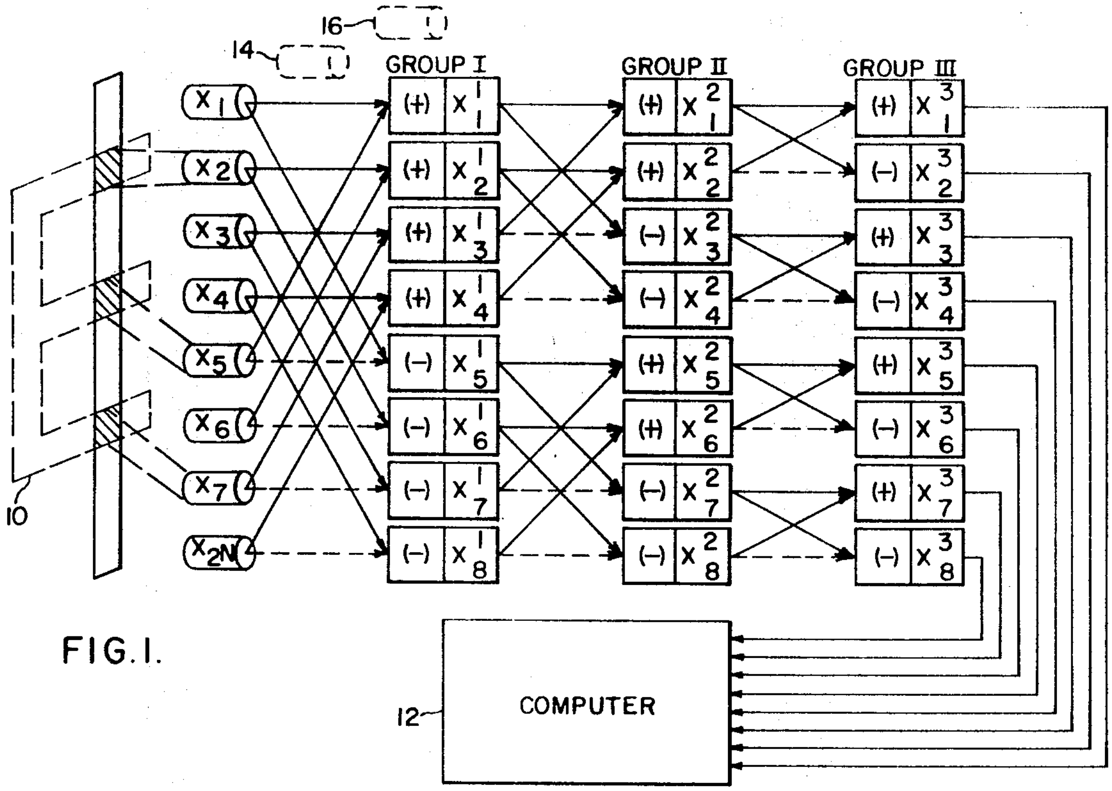
FIG. 1 is a schematic electrical circuit diagram of one embodiment of the invention.

With reference now to the drawings, and particularly to FIG. 1, the circuitry shown includes eight photocells identified as $X_1$, $X_2$, $X_3$ and so on to $X_{2^N}$, N being 3 in the example given. These photocells are arranged in a vertical line in the embodiment of the invention shown and can be used, for example, to identify in one dimension the letter E, indicated by the reference numeral 10 in FIG. 1. Thus, assuming that the letter E is illuminated, dark areas may fall on the photocells $X_2$, $X_5$ and $X_7$. These dark areas will produce outputs from the photocells $X_2$, $X_5$ and $X_7$ which can be identified as "1"

signals; while the remaining photocells which are not focused upon dark areas produce "0" output signals.

The apparatus includes three groups of addition and subtraction circuits together with memory cells, which groups are identified by the numerals I, II and III. The first group includes memory cells $X^1_1$ through $X^1_8$; the second group includes memory cells $X^2_1$ to $X^2_8$; and the third group includes memory cells $X^3_1$ to $X^3_8$. In accordance with the invention, the number of photocells or sensing elements is $2^N$ where N is some integer. In the particular embodiment of the invention shown in FIG. 1, N is 3. Furthermore, it will be noted that the groups of memory cells are equal to N in number (in this case 3).

The first group of memory cells is divided into two parts comprising an upper part including cells $X^1_1$ through $X^1_4$ and a lower part comprising cells $X^1_5$ through $X^1_8$. Each of the cells in the respective groups I, II and III is preceded by an addition or subtraction circuit identified in the drawings as (+) or (−). Each of the cells in the upper half of Group I has applied thereto the sum of an electrical signal from a photocell in the upper half of the photocells $X_1$–$X_8$ and an electrical signal from a photocell in the lower half of the photocells. Thus, memory cell $X^1_1$ has applied thereto the sum of the signals from photocells $X_1$ and $X_5$; the memory cell $X^1_2$ has applied thereto the sum of the electrical signals from photocells $X_2$ and $X_6$, and so on. Conversely, the lower half of the memory cells in Group I has applied thereto the difference between an electrical signal from a photocell in the upper half of the photocells and an electrical signal from a photocell in the lower half the photocells. Thus, memory cell $X^1_5$ has applied thereto the difference of the electrical signals from photocells $X_1$ and $X_5$; memory cell $X^1_6$ has applied thereto the difference of the electrical signals from photocells $X_2$ and $X_6$, and so on. The broken lines in FIG. 1 indicate subtraction; while the solid lines indicate addition.

The sums and differences of the electrical signals stored in the memory cells of Group I are then added or subtracted and applied to memory cells in the second Group II. It will be noted that in this case, however, the sums of two electrical signals are applied to the first two cells $X^2_1$ and $X^2_2$; the differences of two signals are applied to the next two memory cells $X^2_3$ and $X^2_4$; the sums of two signals are applied to the next two memory cells; and the differences of two signals are applied to the last two cells.

Finally, in the third Group III, the sum of two signals from two cells in the second group is applied to alternate ones of the cells in the third group; while the difference of two signals from cells in the second group is applied to the remaining ones of the cells in the third group. Outputs of the cells in the third group are then applied to a computer 12 which compares the magnitudes of the electrical signals from the cells in the third group with stored information to identify the pattern focused onto the photocells $X_1$ through $X_8$. While only a one-dimensional array is shown in FIG. 1, it will be appreciated that a two-dimensional arrangement can be provided as described further in this application.

Figure 2:
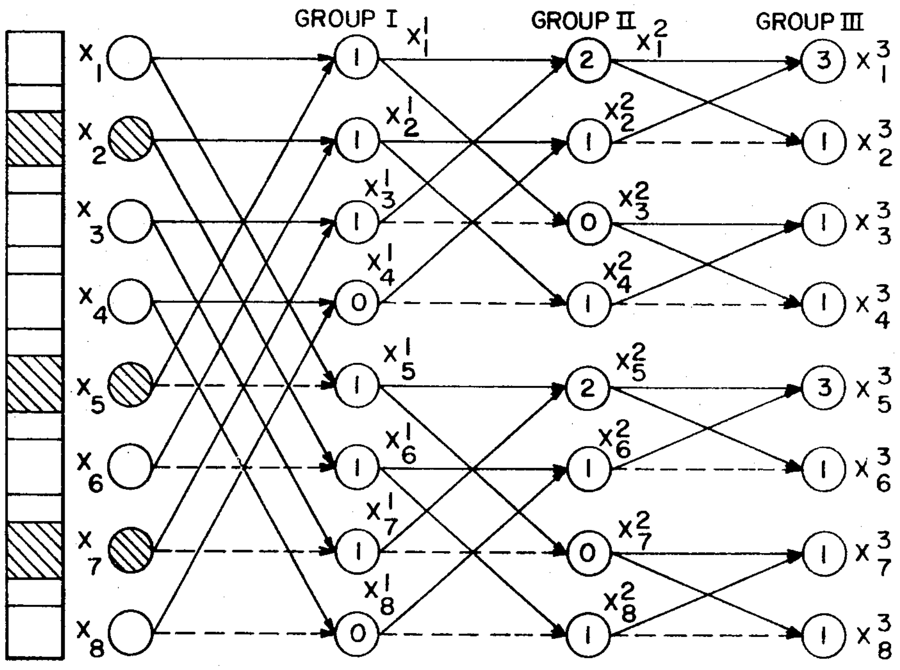
FIG. 2 is a graphical illustration of the operation of the circuitry of FIG. 1 under one set of conditions.

The operation of the circuitry of FIG. 1 is shown graphically in FIG. 2 wherein photocells $X_2$, $X_5$ and $X_7$ are focused onto dark areas while the remaning photocells are focused onto light areas. Under these circumstances, ON or "1" signals will be produced at the outputs of the photocells $X_2$, $X_5$ and $X_7$; while "0" or OFF signals will be produced by the remaining cells. When the signals from photocells $X_1$ and $X_5$ are added and stored in memory cell $X^1_1$, the result is a "1" signal. Similarly, the sum of the signals from photocells $X_2$ and $X_6$ as stored in memory cell $X^2_2$ is "1." The sum of the signals from photocells $X_3$ and $X_7$ is again "1" as stored in memory cell $X^2_3$; whereas the sum of the signals from photocells $X_4$ and $X_8$, both being zero, is "0" as stored in memory cell $X^1_4$.

The difference of the signals from photocells $X_5$ and $X_1$ as stored in memory cell $X^1_5$ is "1," the sign of the signal being ignored. Similarly, the difference of the signals from photocells $X_2$ and $X_6$ as stored in memory cell $X^1_6$ is "1"; the difference of the signals from photocells $X_3$ and $X_7$ as stored in memory cell $X^1_7$ is "1" and the difference of the signals from photocells $X_4$ and $X_8$ as stored in memory cell $X^1_8$ is "0."

Now, turning to Group II of the memory cells, the sum of the signals from memory cells $X^1_1$ and $X^1_3$ as stored in memory cell $X^2_1$ is "2." Similarly, following the foregoing procedure, it will be found that a "1" signal is stored in memory cell $X^2_2$, a "0" signal in memory cell $X^2_3$, a "1" signal stored in memory cell $X^2_4$, a "2" signal stored in memory cell $X^2_5$, a "1" signal stored in memory cell $X^2_6$, a "0" signal stored in memory cell $X^2_7$, and a "1" signal stored in memory cell $X^2_8$.

Finally, in Group III, the sum of the signals from memory cells $X^2_1$ and $X^2_2$ is stored in cell $X^3_1$ and is "3." Similarly, the difference of the signals stored in memory cells $X^2_1$ and $X^2_2$ as now stored in cell $X^3_2$ is "1." The signals stored in cell $X^3_3$ is "1;" the signals stored in cell $X^3_4$ is "1;" the signals stored in cell $X^3_5$ is "3;" the signals stored in cell $X^3_6$ is "1"; the signals stored in cell $X^3_7$ is "1" and the signals stored in cell $X^3_8$ is "1." The output for the pattern shown in FIG. 2 is, therefore, 3-1-a'-1-3-1-1-1-. The computer can then recognize this combination of signals to identify the pattern.

Figure 3:
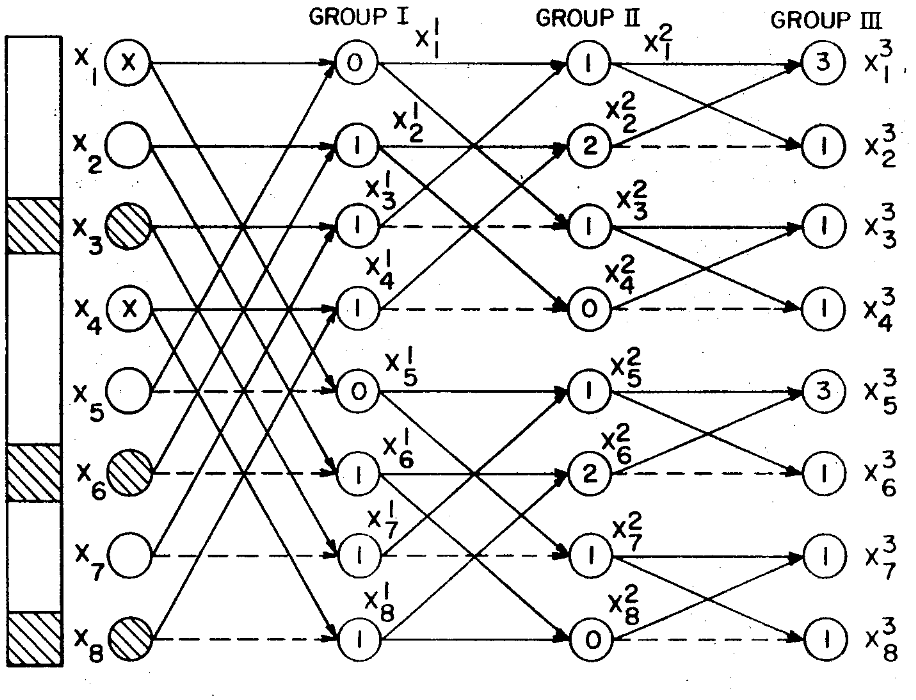
FIG. 3 is a graphical illustration of the operation of the circuitry of FIG. 1 under a different set of conditions.

Now, let us assume that the pattern of FIG. 2 has been shifted downwardly as viewed in FIG. 3. That is, the photocell $X_3$ is now focused onto a dark area as well as the photocells $X_6$ and $X_8$. Following the addition and subtractions steps given above in connection with FIG. 2 with the broken lines indicating subtraction, we find that the cells $X^1_1$ through $X^1_8$ in Group I have a combination of signals 0-1-1-1-0-1-1-1. Likewise, the signals in the memory cells of the third group are in the order of 1-2-1-0-1-2-1-0. The signals in the memory cells of the third Group III, however, are the same as those for FIG. 2.

If the pattern of FIG. 3 were shifted upwardly by two spaces such that photocells $X_1$, $X_4$ and $X_6$ are focused onto dark areas, the signals in the memory cells of Group III would remain the same. It can be seen, therefore, that regardless of the vertical positioning of the pattern with respect to the photocells $X_1$ through $X_8$, the output signals appearing at the memory cells $X^3_1$ through $X^3_8$ in Group III are always the same. Further, the shift invariant property of the output persists not only for black and white (binary), but also for inputs represented by arrays of analog (grey) values.

Thus, for an array of $M=2^N$ input variables (numbered from 1 to $M$), $N$ transformation steps are required.

In the first transformation step the input variables are divided into two groups, numbered from 1 to $M/2$ and from $M/2$ to $M$. The variables $X^1$ of the first transform layer or Group I are then calculated by $$X_i^{I}=X_i+X_{i+M/2} \qquad \Big|_{i=1}^{M/2}$$

$$X^{I}_{i+M/2}=|X_i-X_{i+M/2}| \qquad \Big|_{i=1}^{M/2}$$

where $i$ is the first, second, third and fourth storage cell in Group I.

In the second transformation step the two groups of the variables in layer or Group I are again divided into two subgroups each, giving the variables of layer or Group II by $$X_i^{II}=X_i^{I}+X^{I}_{i+M/4} \qquad \Big|_{i=1}^{M/4}$$

$$X^{II}_{i+M/4}=|X_i^{I}-X^{I}_{i+M/4}| \qquad \Big|_{i=1}^{M/4}$$

$$X^{II}_{i+M/2}=X^{I}_{i+M/2}+X^{I}_{i+3M/4} \qquad \Big|_{i=1}^{M/4}$$

$$X^{II}_{i+3M/4}=|X^{I}_{i+M/2}-X^{I}_{i+3M/4}| \qquad \Big|_{i=1}^{M/4}$$

This procedure is repeated $N(=\log_2 M)$ times.

Figure 4:
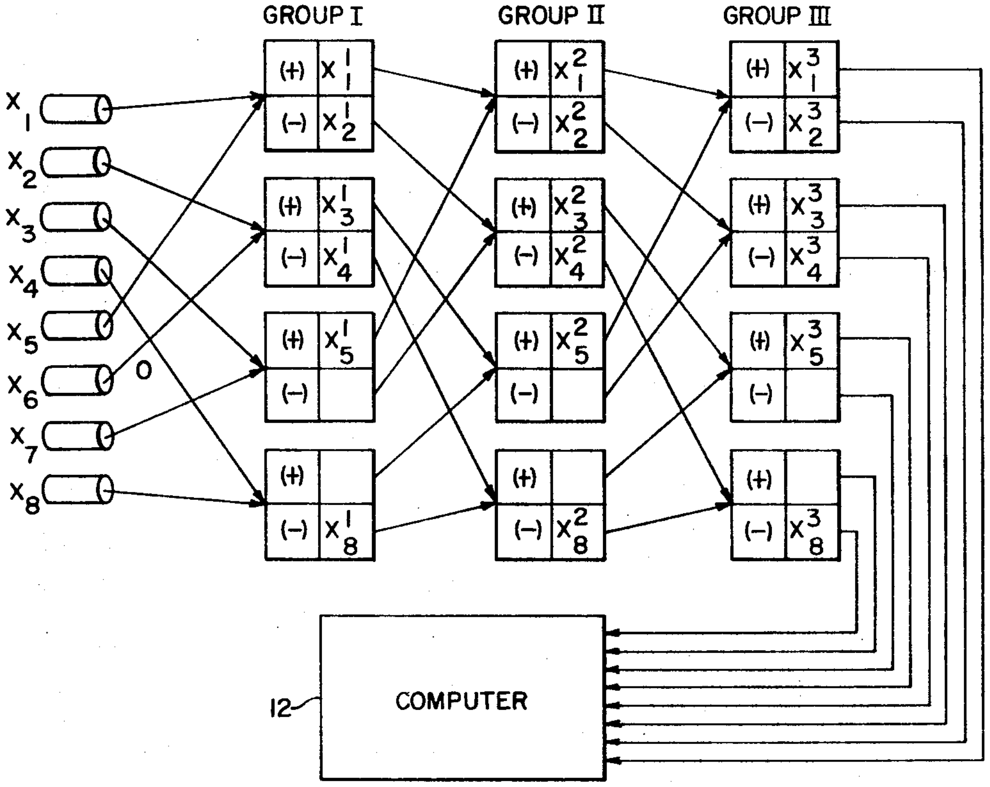
FIG. 4 is a schematic circuit illustration of another embodiment of the invention.

With reference now to FIG. 4, another embodiment of the invention is shown which is similar to that of FIG. 1 in that it includes three groups of memory cells and requires three computation steps in the transform. Furthermore, each group of memory cells is equal in number to the number of photocells $X_1$ through $X_8$. Accordingly, elements in FIG. 4 which correspond to those of FIG. 1 are identified by like reference numerals.

In this case, however, the same operations are performed in each transform step of the algorithm. The outputs of the photocells $X_1$ and $X_4$ are added and stored in memory cell $X^1_1$. These same signals are subtracted and stored in memory cell $X^1_2$. The electrical signals from photocells $X_2$ and $X_6$ are added and stored in memory cell $X^1_3$ and at the same time are subtracted and stored in memory cell $X^1_4$. The electrical signals from photocells $X_3$ and $X_7$ are added and stored in memory cell $X^1_5$ and subtracted and stored in memory cell $X^1_6$. Finally, the electrical signals from photocells $X_4$ and $X_8$ are added and stored in memory cell $X^1{}_7$ and subtracted and stored in memory cell $X^1_8$. The outputs of the memory cells $X^1_1$ through $X^1_8$ are then added and subtracted and stored in the memory cells of Group II in the same manner as were the electrical signals from photocells $X_1$ through $X_8$. Finally, the electrical signals stored in the memory cells of Group II are added and subtracted in still the same manner and stored in the memory cells of Group III.

Figure 5:
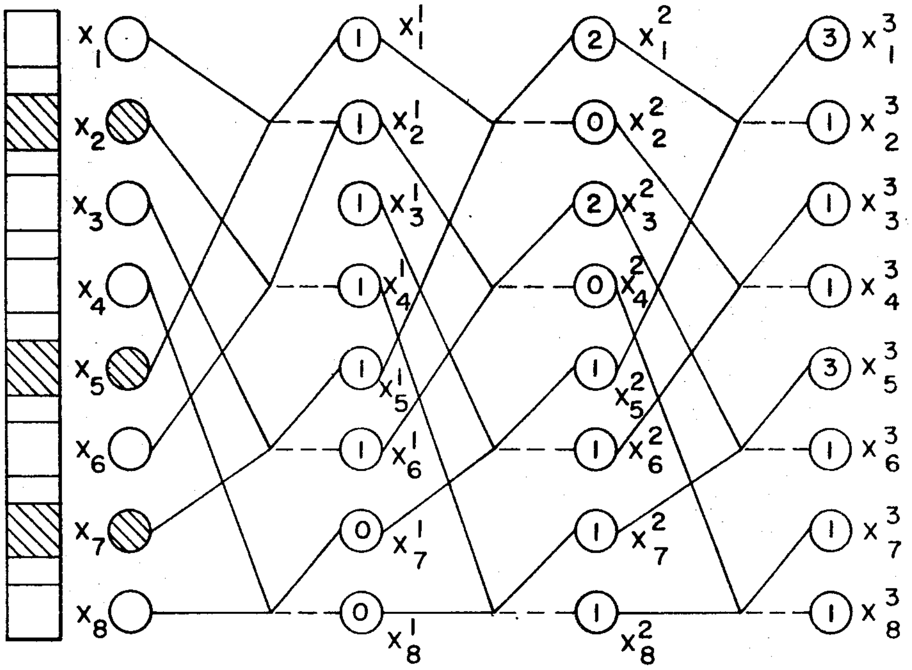
FIG. 5 is a graphical illustration of the operation of the circuit of FIG. 4.

A graphical illustration of the operation of the circuitry of FIG. 4 is shown in FIG. 5 wherein photocells $x_2$, $X_5$ and $X_7$ are exposed to darkened areas; while the remainder of the photocells are exposed to light areas, the same as was the case with FIG. 2. Adding a "O" signal from photocell $X_1$ with a "1" signal from photocell $X_5$ produces a "1" signal in memory cell $X^1_1$. Similarly, subtracting a "1" signal from photocell $X_5$ from a "O" signal from photocell $X_1$ produces a "1" signal in memory cell $X^1_2$. Adding a "1" signal from photocell $X_2$ with a "O" signal from photocell $X_6$ produces a "1" signal in memory cell $X^1_3$; whereas subtracting a "O" signal from photocell $X_6$ from a "1" signal from photocell $X_2$ again produces a "1" signal in memory cell $X^1_4$. This process is repeated producing a "1" signal in memory cell $X^1_5$, a "1" signal in memory cell $X^1_6$, a "O" signal in memory cell $X^1_7$ and a "O" signal in memory cell $X^1_8$. The resulting combination of signals is, therefore, 1-1-a'-1-1-1-0-D. When this process is repeated in Group II with the outputs of the memory cells in Group I being added and subtracted as shown, the resulting combination of signals is 2-0-2-0-1-1-1-1. Finally, when the process is repeated in Group III, the resulting combination of signals is 3-1-1-1-3-1-1-1. It will be noted that this combination of signals is identical to that produced with the transform of FIG. 1. Furthermore, if the pattern is shifted upwardly or downwardly, it will be seen that the combination of signals in the third group is still the same, although it will vary in the first and second groups.

For the transform of FIG. 5, the number of the transform steps required for $M$ input variables $X_1$ through $X_M$ is again $N=\log_2 M$.

In every transform step the variables of the new layer $R$ are calculated from the variables of the preceding layer $R-1$ by $$X_{2i+1}{}^{R}=X_i{}^{R11}+X_{i\ +M/2}{}^{R11}$$
$$X_{2i}{}^{R}=\left|X_i{}^{R11}-X_{i+M/2}{}^{R11}\right|$$

The advantage of this algorithm is that the same operations are performed in every transform step.

For two-dimensional patterns one can use either of two one-dimensional transforms in sequence for $X$ and $Y$, or a two-dimensional transform where the sum, respectively the absolute value of the difference of pairs of four variables, is used to calculate the new variables.

If two one-dimensional transforms are used, either the rows or the columns of the input field will be "floating," depending on whether the transform in $X$ or $Y$ is carried out first, i.e., if the transform in $X$ is done first, the output remains unchanged not only when the whole pattern is shifted but also when a relative shift along single lines exists.

This can be of advantage for the recognition of handwritten patterns that have a varying angle of inclination.

An algorithm for a two-dimensional transform that uses four variables of a layer for the calculation of every variable of the subsequent layer is given below. The variables of the input field form an array.

$$\begin{pmatrix} X_{1,1} \cdots & X_{1,j} \cdots & X_{1,M} \\ 1 & 1 & 1 \\ 1 & 1 & 1 \\ 1 & 1 & 1 \\ 1 & 1 & 1 \\ X_{i,1} \cdots & X_{i,j} \cdots & X_{i,M} \\ 1 & 1 & 1 \\ 1 & 1 & 1 \\ 1 & 1 & 1 \\ 1 & 1 & 1 \\ X_{M,1} \cdots & X_{M,j} \cdots & X_{M,M} \end{pmatrix}$$

The corresponding variables of the subsequent layers are denoted by $X_{i,j}{}^{I}$ for the first transform layer, $X_{i,j}{}^{II}$ for the second layer, etc.

The variables of the first transform layer are then given by $$X^{I}_{i,j}=X_{i,j}+X_{i+M/2,j}+X_{i,j+M/2}+X_{i+M/2,j+M/2}\quad \Big|_{i,j=1}^{M/2}$$

$$X^{I}_{i+M/2,j}=|X_{i,j}-X_{i+M/2,j}|+|X_{i,j+M/2}-X_{i+M/2,j+M/2}|\ \Big|_{i,j=1}^{M/2}$$

$$X^{I}_{i,j+M/2}=|(X_{i,j}+X_{i+M/2,j})-(X_{i,j+M/2}+X_{i+M/2,j+M/2})|\Big|_{i,j=1}^{M/2}$$

$$X^{I}_{i+M/2,j+M/2}=\Big||X_{i,j}-X_{i+M/2,j}|-|X_{i,j+M/2}-X_{i+M/2,j+M/2}|\Big|\ \Big|_{i,j=1}^{M/2}$$

The variables of layer II are calculated by dividing the variables of layer I into subgroups of variables that are $M/4$ elements apart, and so forth, until $N=\log_2 M$ transformation steps have been executed.

The transforms given above are invariant under cyclic permutation. The transformed data, therefore, does not depend on shifts in the input pattern in the X- and Y-directions.

Figure 6A:
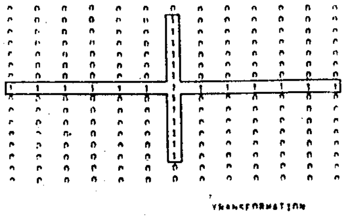
Figure 6C:
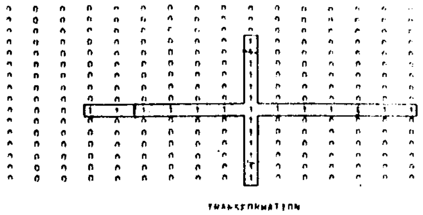

With reference now to FIGS. 6A—6D, the effect of a shift in a pattern on the output of the device is shown. In FIGS. 6A and 6C, two crosses are shown in the field of view of a two-dimensional array of photocells, the cross in FIG. 6C being shifted with respect to that in FIG. 6A. The dark areas intercepted by the photocells are indicated by "1" whereas the light areas are indicated by "0." Note that the transforms shown in FIGS. 6B and 6D for the crosses of FIGS. 6A and 6C are identical, notwithstanding the fact that the two crosses are shifted. In the transform configurations shown in FIGS. 6A—6D, there are 16 rows of photocells in the X-direction and 16 rows of photocells in the Y-direction, which means that there will have to be four groups of memory cells in the transform apparatus in both the X- and Y-directions.

Figure 6B:
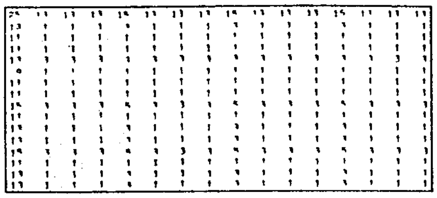
Figure 6D:
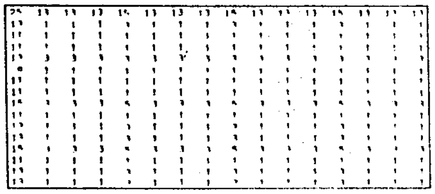
Figure 6E:
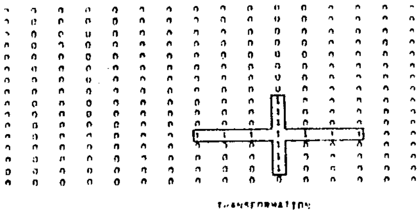
Figure 6G:
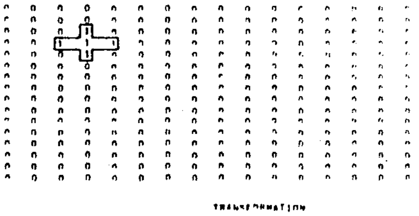
Figure 6F:
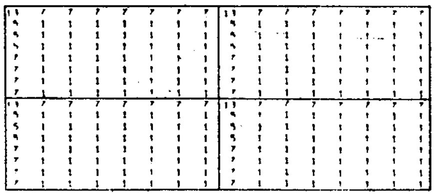
Figure 6H:
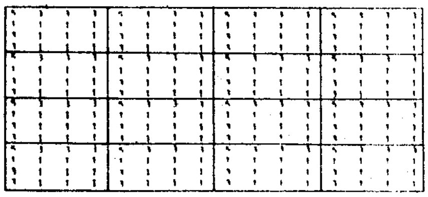

The effect of patterns of different sizes with the transform of the present invention is shown in FIGS. 6E—6H. In FIG. 6E, one crossbar of the cross covers seven photocells while the other crossbar also covers seven photocells in contrast to the crosses of FIGS. 6A and 6C wherein the crossbars cover 13 photocells. Under these circumstances, the crossbars span less than half the photocells in both the X- and Y-directions. As a result, a repeating transformation is produced as shown in FIG. 6F wherein the transformation is divided into four parts, all of which are identical.

In FIG. 6G, the cross is still reduced further to the point where the photocells which its crossbars cover are less than one-fourth the total number of photocells in the X- and Y-directions. Under these circumstances, the transformation repeats 16 times. The computer to which the last group of memory cells is connected, therefore, can be programmed to recognize any one of the transformations of FIGS. 6B, 6D, 6F or 6H as a cross. Other patterns, letters, numerals or the like will perform in the same manner. That is, as long as the pattern in both dimensions is greater than one-half the field of view, a single transformation will be produced as shown in FIG. 6B or 6D. When the dimensions in the X- and Y-directions are less than one-half, the pattern of the transformation repeats itself four times; whereas when the dimensions in the X- and Y-directions are less than one-quarter, the transformation repeats itself 16 times.

Although the invention has been shown in connection with certain specific embodiments, it will be readily apparent to those skilled in the art that various changes in form and arrangement of parts may be made to suit requirements without departing from the spirit and scope of the invention. In this respect, it will be apparent that if speed is not a factor, fluid logic systems can be used in place of the electrical system shown herein. In this latter case, the various signals will be fluid signals rather than electrical signals.

We claim as our invention:

1. In a recognition apparatus, the combination of:

an array of sensors including at least one row extending along a straight line and having M-sensors therein, each of said sensors being adapted to produce a signal proportional in magnitude to a characteristic input to which it is subjected, a plurality of groups of memory cells each having M-memory cells therein, input adding and differencing means connecting said sensors to a first of said groups, additional adding and differencing means connecting the memory cells in each of said groups to the memory cells in a succeeding group in said plurality of groups, the addition and differencing performed by said input and additional adding and differencing means being the only arithmetical operations performed on said signals, and pattern recognition means connected to the last group of memory cells for recognizing a pattern sensed by said sensors as determined by the signals stored in said last group of memory cells.

2. The combination of claim 1 wherein said sensors are optical sensors adapted to produce electrical signals proportional to a characteristic of light to which they are subjected.

3. The combination of claim 2 wherein said electrical signals are proportional to light intensity.

4. The combination of claim 1 wherein said sensors are $2^N$ in number where $N$ is an integer, and said groups of memory cells are $N$ in number.

5. The combination of claim 3 wherein said first group of memory cells is divided into two parts, the memory cells in one part storing the sum of two signals from respective ones of said sensors and the other part of said group storing the difference of signals from respective ones of said sensors.

6. The combination of claim 5 wherein the second group of memory cells is divided into four parts, two parts of which store the sums of signals from respective memory cells in the first group and the other two parts of which receive the difference of signals stored in respective memory cells in the first group.

7. The combination of claim 6 wherein the memory cells in a third group are divided into eight parts half of which receive the sums of signals from respective memory cells in the second group and the other half of which receive the differences of signals from respective memory cells in the second group.

8. The combination of claim 4 wherein each of said groups of memory cells are divided into parts, the number of parts in each group being a power of 2, half of the parts in each group receiving the sum of two signals and the other half of the parts in each group receiving the difference of two signals.

9. The combination of claim 1 wherein said array of sensors includes at least one row of sensors extending along one dimension and at least one row of sensors extending along a dimension at right angles to said first-mentioned row.

10. The combination of claim 1 wherein each of said groups of memory cells is divided into two parts, the memory cells in one part storing the sum of two signals and the memory cells in the other part storing the difference of two signals.